(12) United States Patent
Sakaguchi et al.

(10) Patent No.: US 8,452,468 B2
(45) Date of Patent: May 28, 2013

(54) VESSEL STEERING SYSTEM

(75) Inventors: Ryo Sakaguchi, Toyko (JP); Hiroyuki Ono, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 304 days.

(21) Appl. No.: 12/814,041

(22) Filed: Jun. 11, 2010

(65) Prior Publication Data

US 2011/0137499 A1 Jun. 9, 2011

(30) Foreign Application Priority Data

Dec. 8, 2009 (JP) ................................. 2009-278423

(51) Int. Cl.
*G05D 3/00* (2006.01)
(52) U.S. Cl.
USPC ............................................................ 701/21
(58) Field of Classification Search
USPC ............................................................ 701/21
See application file for complete search history.

(56) References Cited

U.S. PATENT DOCUMENTS

| 7,527,537 | B2 | 5/2009 | Mizutani |
| 2006/0110990 | A1 | 5/2006 | Yazaki et al. |
| 2006/0235602 | A1 | 10/2006 | Ishida et al. |
| 2010/0151750 | A1* | 6/2010 | Ito ..................................... 440/1 |

FOREIGN PATENT DOCUMENTS

| JP | 2005-280579 A | 10/2005 |
| JP | 2006-150998 A | 6/2006 |
| JP | 2006-299856 A | 11/2006 |
| JP | 2007-126023 A | 5/2007 |
| JP | 2010-143321 A | 7/2010 |

OTHER PUBLICATIONS

Communication, dated Nov. 29, 2011, issued by the Japanese Patent Office in corresponding Japanese Application No. 2009-278423.
Communication, dated Mar. 19, 2013, issued by the Japanese Patent Office in corresponding Japanese Application No. 2012-010254.
Communication, dated Mar. 19, 2013, issued by the Japanese Patent Office in corresponding Japanese Application No. 2012-010255.

* cited by examiner

*Primary Examiner* — James Trammell
*Assistant Examiner* — Jerrah Edwards
(74) *Attorney, Agent, or Firm* — Sughrue Mion, PLLC

(57) ABSTRACT

A steering system includes: a steering wheel; a steering wheel sensor configured to detect an operation angle of the steering wheel; an actuator configured to turn an outboard engine; a plurality of turn angle sensors including a first turn angle sensor configured to detect a turn angle; and a control unit configured to calculate a controlling turn angle, and to drive the actuator to turn the outboard engine in accordance with a difference between the controlling turn angle and the turn angle. If an anomaly of the first turn angle sensor is detected, the control unit continues to drive the actuator based on information from a second turn angle sensor in a normal state, and drives the actuator so as to limit the turn angle of the outboard engine as compared with a case in which the first turn angle sensor is in a normal state.

9 Claims, 12 Drawing Sheets

VESSEL STEERING SYSTEM

CROSS-REFERENCE TO RELATED APPLICATIONS

This application claims priority from Japanese Patent Application No. 2009-278423 filed on Dec. 8, 2009, the entire contents of which are incorporated herein by reference.

BACKGROUND OF THE INVENTION

1. Field of the Invention

The present invention relates to a steering system in which an outboard engine is controlled to turn by an electric motor and more particularly to a steering system having an additional function to deal with a case where an anomaly of a turn angle sensor for detecting a turn angle of an outboard engine occurs.

2. Description of Related Art

JP-A-2005-280579 describes an electric steering system which utilizes an electric motor, as a vessel steering system. In JP-A-2005-280579, the vessel steering system includes an actuator for turning an outboard engine, a turn angle sensor for detecting a turn angle of the outboard engine, a steering wheel sensor for detecting a rotational angle of a steering wheel, and an actuator controller for outputting a control signal to the actuator in response to signals from the turn angle sensor and the steering wheel sensor. In the vessel steering system, the steering wheel and the outboard engine are connected only electrically. A turn angle is determined based on an amount in which the steering wheel is operated, and the actuator is driven by the value of the determined turn angle such that the outboard engine is turned as intended by an operator.

In addition, JP-A-2007-126023 proposes a use of two or more actuator controllers or one actuator for a plurality of outboard engines, and doesn't propose a use of one actuator and one controller for one outboard engine.

SUMMARY OF THE INVENTION

In the steering systems as described above, when the turn angle sensor fails, the actuator controller cannot obtain the turn position of the outboard engine. In this case, even after the outboard engine has reached its operation limit position, the actuator controller can be driven continuously, which may result in a failure of the actuator. On the other hand, when the actuator is stopped, the turning of the outboard engine cannot be implemented, and the vessel cannot be steered properly.

The invention has been made in view of the above circumstances and an object thereof is to provide a steering system which can steer a vessel without a failure of an actuator even when a turn angle sensor fails or a signal from the turn angle sensor is not inputted into an actuator controller.

According to a first aspect of the invention, there is provided a steering system for a vessel in which at least one outboard engine is installed, said steering system comprising: a steering wheel configured to receive an instruction of a steering direction; a steering wheel sensor configured to detect an operation angle of the steering wheel; an actuator configured to turn the outboard engine; a plurality of turn angle sensors including a first turn angle sensor configured to detect a turn angle of the outboard engine turned by the actuator; and a control unit configured to calculate a controlling turn angle for driving the actuator to turn the outboard engine based on the operation angle, and to drive the actuator to turn the outboard engine in accordance with a difference between the controlling turn angle and the turn angle, wherein if an anomaly of the first turn angle sensor is detected, the control unit continues to drive the actuator to turn the outboard engine based on information from a second turn angle sensor of the plurality of turn angle sensors which is in a normal state, and drives the actuator so as to limit the turn angle of the outboard engine as compared with a case in which the first turn angle sensor is in a normal state.

According to another aspect of the invention, there is provided a steering system for a vessel in which at least one outboard engine is installed, said steering system comprising: a steering wheel configured to receive an instruction of a steering direction; a steering wheel sensor configured to detect an operation angle of the steering wheel; an actuator configured to turn the outboard engine; a turn angle sensor configured to detect a turn angle of the outboard engine turned by the actuator; and a control unit configured to calculate a controlling turn angle for driving the actuator to turn the outboard engine based on the operation angle, and to drive the actuator to turn the outboard engine in accordance with a difference between the controlling turn angle and the turn angle, wherein if an anomaly of the turn angle sensor is detected, the control unit continues to drive the actuator to turn the outboard engine based on a predetermined current over a predetermined length of time which is determined in advance in accordance with the controlling turn angle.

According to the steering system of the above aspects of the invention a steering system can keep on steering a vessel without a failure of an actuator even when an anomaly of the turn angle sensor is detected.

DETAILED DESCRIPTION OF THE EMBODIMENTS

Embodiment 1

Figure 1:
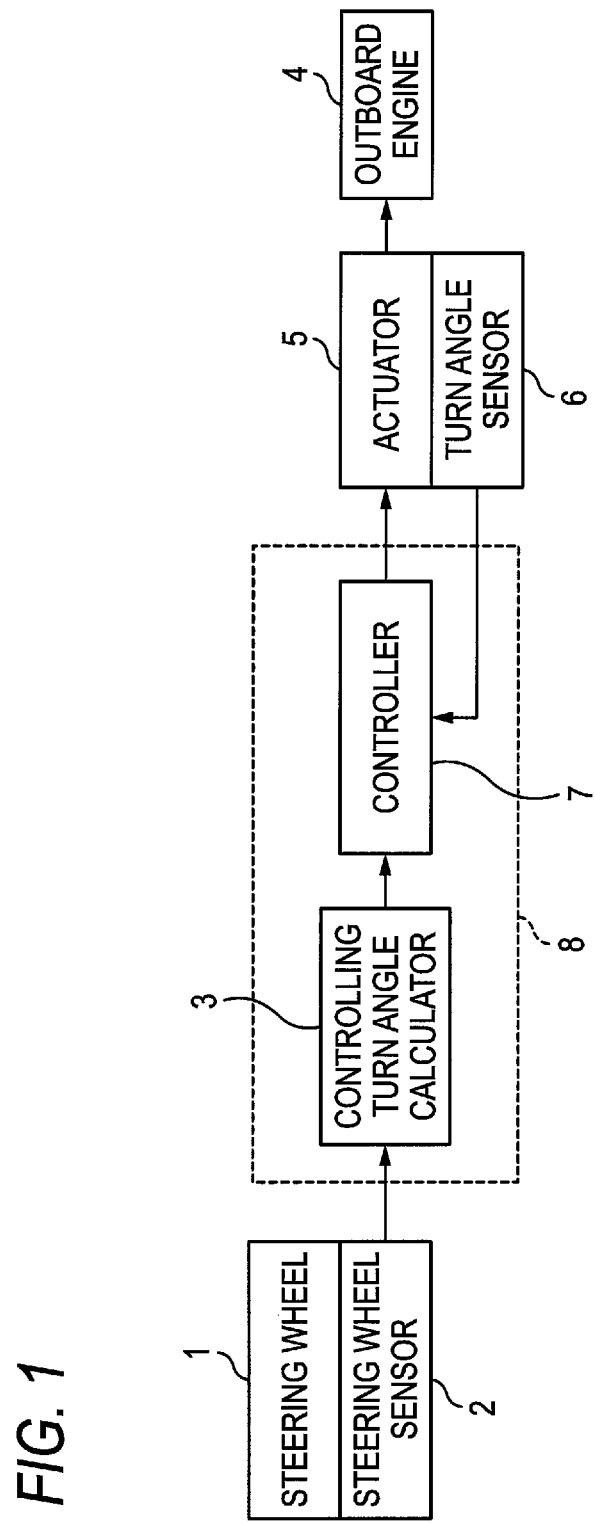
FIG. 1 is a system configuration diagram of a steering system of Embodiment 1 of the invention.

Hereinafter, although respective embodiments of the invention will be described based on the drawings, in the respective drawings, the same reference numerals will be given to the same or corresponding members and portions for description.

FIG. 1 is a system configuration diagram of an embodiment of the invention. A steering system of the embodiment includes an outboard engine (4) as a power source, a steering wheel (1) installed at a helmseat on a vessel body, a steering wheel sensor (2) for detecting an operation angle of the steering wheel (1), an actuator (5) for turning the outboard engine, a turn angle sensor (6) for detecting a turn angle of the outboard engine that is controlled by the actuator, and a control unit (8) into which a signal from the turn angle sensor and a signal from the steering wheel sensor are inputted, which calculates a controlling turn angle in accordance with the operation angle and which outputs to the actuator (5) a drive signal to control the turn angle of the outboard engine (4) based on a difference between the controlling turn angle and the turn angle. Here, the control unit (8) includes a controlling turn angle calculator (3) for calculating a controlling turn angle in accordance with the operation angle from a functional and installation position on the vessel and a controller (7) for outputting a drive signal to the actuator (5). There exist vessels which install a plurality of outboard engines in addition to those installing a single outboard engine. In addition, as to actuators, there is a type of actuator in which a single actuator drives a plurality of outboard engines, and there can be considered a configuration in which an actuator is provided for each of a plurality of outboard engines. Furthermore, there exists a possibility that control units and turn angle sensors are provided for the outboard engine or the actuator. Namely, at least one outboard engine (4), one actuator (5), one turn angle sensor (6) and one control unit (8) are installed, and depending on vessels, pluralities of outboard engines, actuators, turn angle sensors and control units are installed, there existing a wide variety of combinations thereof. Further, there may be a case where the controlling angle calculator (3) and the controller (7) or the controllers (7) are connected by a so-called CAN.

Firstly, an operation will be described based on FIG. 2 when the turn angle sensor is normal.

When the vessel operator turns the steering wheel (1) in S201, the steering wheel sensor (2) detects a steering angle of the steering wheel in S202, and the controlling turn angle calculator (3) receives the steering angle carried by a steering wheel sensor signal in S203. The controlling turn angle calculator (3) calculates a controlling angle trough which the outboard engine (4) is to be turned based on the received information in S204, and in S205, a controlling turn angle signal is transmitted to the controller (7). Here, for example, the controlling turn angle does not have to be an absolute value but may be expressed by a variation from a controlling turn angle that has last been transmitted. If the variation is a positive number, the outboard engine is turned towards a starboard side, whereas if the variation is a negative number, the outboard engine is turned towards a port side. In the turn angle sensor, an end of the port side is referred to as 100%, an end of the starboard side as −100% and a center point as 0.

When the controller (7) receives the controlling turn angle signal from the controlling turn angle calculator (3) and a current turn angle signal from the turn angle sensor (6) in S206, a controlling turn angle is added to a current turn angle in S207 so as to calculate a target turn angle. The controller (7) performs a clipping operation so that the target turn angle falls within a range of −100% to 100% in S208. Whether or not a value of the current turn angle and a value of the target turn angle coincide with each other is investigated in S209. If the target turn angle and the current turn angle do not coincide with each other (NO), the current turn angle and the target turn angle are compared in S210. If the current turn angle is larger than the target turn angle (YES), the outboard engine (4) is turned leftwards in S211, whereas the current turn angle is smaller than the target turn angle (NO), the outboard engine (4) is turned rightwards in S212. When the target turn angle and the current turn angle come to coincide with each other (YES), the driving of the actuator is stopped in S213. In this way, the controller (7) is responsible for performing a feedback control in which the actuator continues to be driven until the current turn angle and the target turn angle come to coincide with each other.

Next, a method for detecting an anomaly of the turn angle sensor will be described.

An anomaly of the turn angle sensor can be detected through hardware detection by the controller (7) by opening and short circuiting a power supply for the turn angle sensor, opening and short circuiting the ground and opening and short circuiting a signal. In addition, in a case where a plurality of turn angle sensors are provided, the turn angle sensor can be determined to be anomalous by detecting a case where a relationship between signal characteristics of the sensors does not fall within predetermined values. Further, an anomaly of the turn angle sensor can be detected through software detection in which the turn angle sensor is determined to be anomalous when the value of the turn angle sensor does not change although the actuator is driven by the controller.

In the system like this, when an anomaly of the turn angle sensor is detected, since an actual position of the actuator differs from a value of the turn angle sensor, there is caused a possibility that the actuator continues to move in a different direction from the intention of the vessel operator or the actuator stops and works in no way. Then, a method will be described for allowing the steering system to turn without a failure of the actuator even when an anomaly of the turn angle sensor is detected.

A method will be described which deals with a case where the controller (7) detects an anomaly of the turn angle sensor (6) according to a flowchart shown in FIG. 3. The flowchart shown in FIG. 3 is understood to be inserted between S206 and S207 in FIG. 2.

Figure 2:
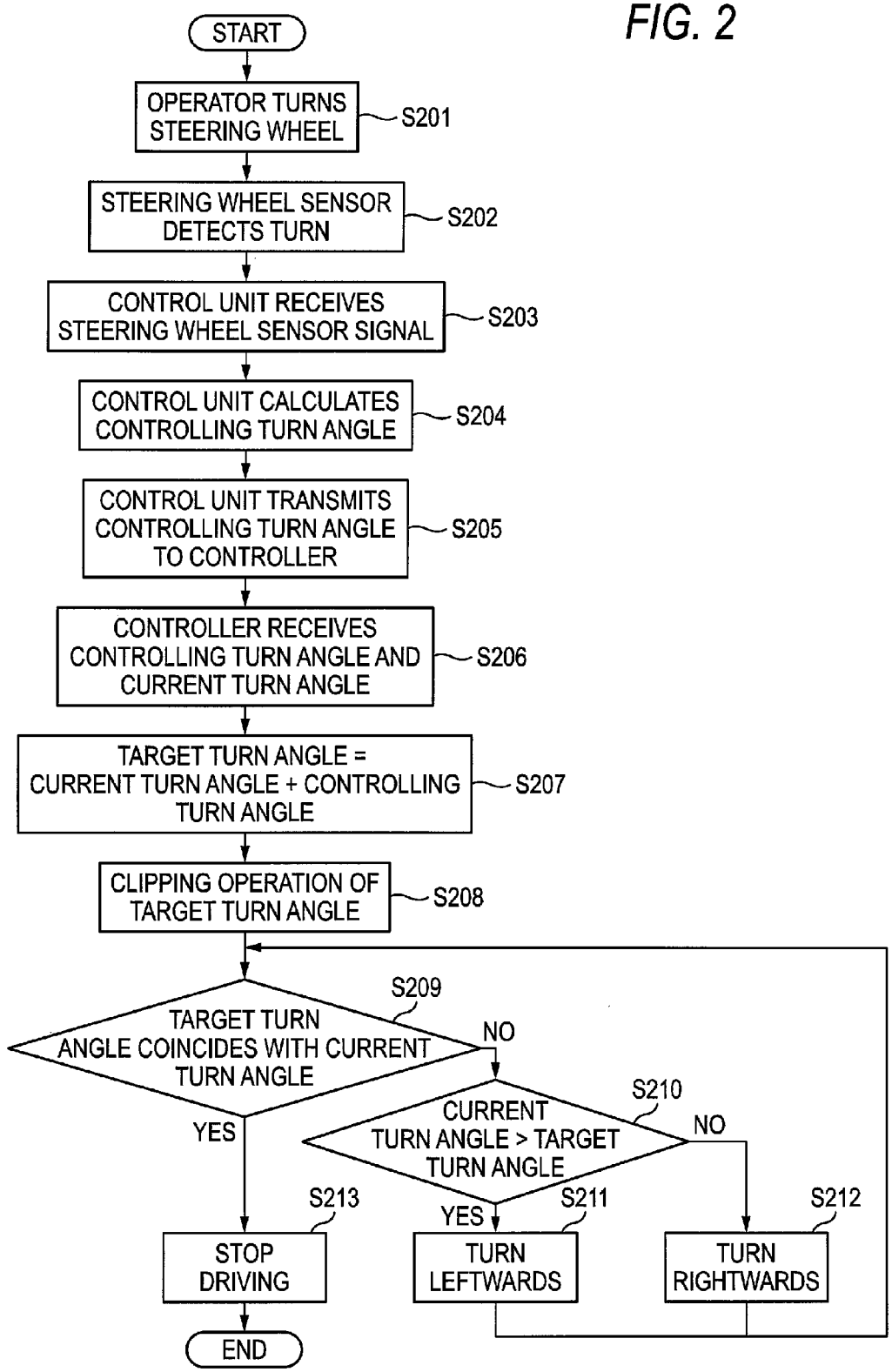
FIG. 2 is a flowchart of controlling a turn angle sensor when it is normal.
Figure 3:
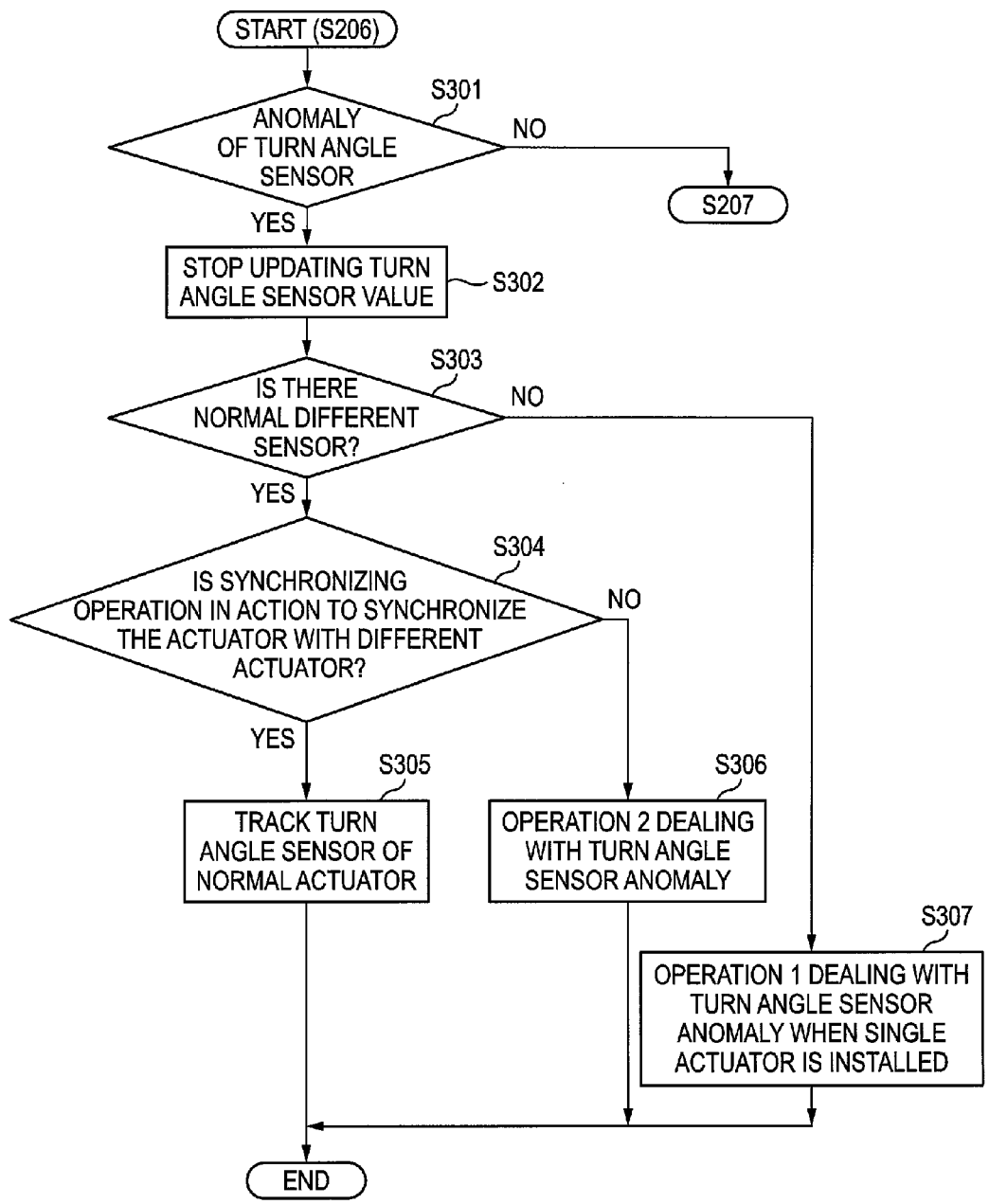
FIG. 3 is a flowchart of a control in Embodiment 1.

Whether or not there exists an anomaly of the turn angle sensor is detected by the controller in S301, and if there exists no anomaly (NO), the flow of the method returns to S207 in FIG. 2. On the other hand, if an anomaly of the turn angle sensor is detected (YES), the controller stops updating the value of the turn angle sensor in S302. When the turn angle sensor operates normally, the controller holds the current value and the past value of the turn angle sensor. When the turn angle sensor is anomalous, the past value of the turn angle sensor can be held as a substantially accurate value by stopping updating the value of the turn angle sensor. Next, with controllers electrically connected, whether or not there exists a normal different turn angle sensor is verified by use of a CAN communication, for example, in S303. If there exists a normal different turn angle sensor, the flow proceeds to S304, whereas if there exists no normal different turn angle sensor, the flow proceeds to S307. In S304, whether or not a synchronizing operation was performed to control actuators before an anomaly of the turn angle sensor had occurred is verified. Here, the synchronizing operation denotes a state in which the plurality of actuators are linked to be turned at substantially the same angle by operating the steering wheel. If the synchronizing operation was performed to control the actuators, the actuator for the turn angle sensor which is anomalous performs its control according to the value of the normal turn angle sensor in S305. Since if the synchronizing operation was performed, a plurality of outboard engines are considered to be in substantially the same positions, the operation of the turn angle sensors can be ensured by allowing the anomalous turn angle sensor to perform its control according to the normal turn angle sensor.

On the other hand, if no synchronizing operation was performed to control the actuators, for example, when turning the vessel to the right, the outboard engine on the starboard side is turned largely while the outboard engine on the port side is turned little. Even when moving the vessel straight ahead, the outboard engines are driven so that the leftward and rightward turning directions become opposite. Depending on operation modes such as a mode in which the vessel is moved sideways by reversing the propelling directions of propellers of the left and right outboard engines or a mode in which the outboard engines are turned in an opposite direction, there occurs a case where the synchronizing operation is not performed. As this occurs, although a special control operation in which a limiting operation is added is performed in S306, the details of the operation will be described later. If there exists no normal turn angle sensor, although a special operation is performed in S307 for a case where there exists only one turn angle sensor and an anomaly thereof is detected, the details thereof will also be described later.

Figure 4:
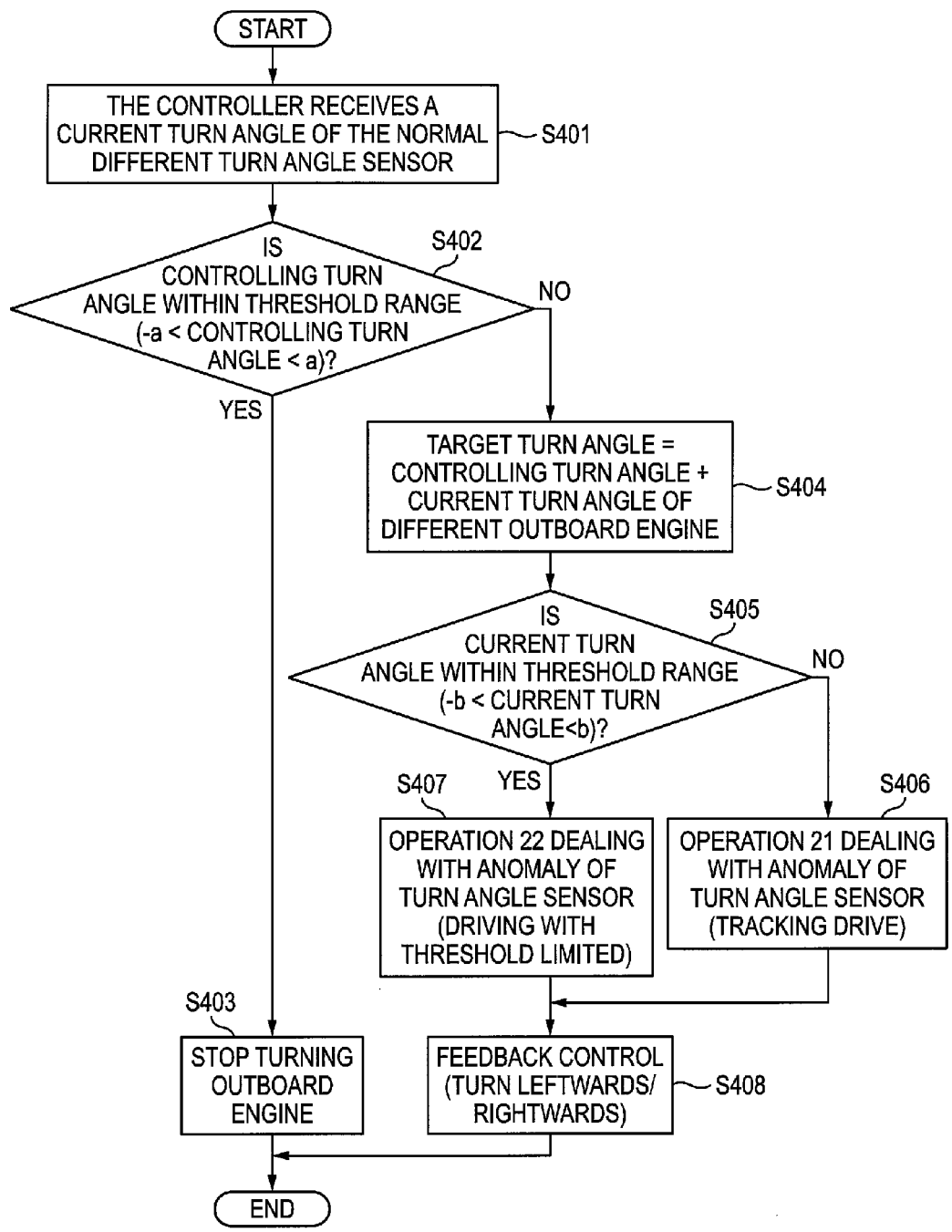
FIG. 4 is a flowchart of a control in Embodiment 1.

Next, the details of the control in S305 which depends on the normal different turn angle sensor will be described in greater detail along a flowchart shown in FIG. 4. The controller (7) which has detected the anomaly of the turn angle sensor receives a current turn angle of the normal different turn angle sensor in S401. In S402, whether or not the controlling turn angle falls within a range of predetermined thresholds (−a<the controlling turn angle<a) is determined. This is intended for an amount of play of the steering wheel, and fine steering wheel operations are ignored so as not to affect the turn of the outboard engines. If the controlling turn angle falls within the range of predetermined thresholds, since the outboard engines are not driven in S403, an actuator turning stop signal is outputted. In contrast, if the controlling turn angle is out of the range of predetermined thresholds, the current turn angle of the other outboard engine is added to the controlling turn angle so as to calculate a target turn angle in S404. Thereafter, although a turn angle anomaly control operation is performed, this anomaly control operation is divided into two patterns. In S405, the current turn angle is compared with a threshold value b. Here |b|>|a|, and whether or not the outboard engine has been turned to the proximity to a port end or turned to the proximity to a starboard end is checked.

If the current turn angle is determined to be equal to or larger than |b| in S405, the outboard engine continues to be driven to be turned in accordance with the value of the turn angle sensor of the other outboard engine in S406, and this tracking control by the turn angle sensor of the other outboard engine is made to continue until the tracking control enters the range of the threshold b. On the other hand, in S407, if the tracking operation enters the range of the threshold b or the current turn angle is equal to or larger than the threshold |b|, a similar feed back control is performed by making use of the value of the turn angle sensor of the other outboard engine. However, the actuators are driven to be controlled so that the target turn angle is limited to stay within the range b so that the turn angle does not exceed the |b|. Namely, a control area is limited further than when the turn angle sensor is normal by a target turn angle clipping operation. This is because since depending on outboard engines, a mounting position or an inclination differs one by one or outboard engines and turn angle sensors have their own production tolerances, there is a possibility that a deviation is produced in the turn angle, and hence, the target turn angle is limited to be within the range b. In S406, S407, if the target turn angle and the current turn angle do not coincide with each other, if the target turn angle is smaller than the current turn angle in S408, the outboard engine is turned leftwards, whereas if the target turn angle is larger than the current turn angle, the outboard engine is turned rightwards. In addition, if the target turn angle coincides with the current turn angle, the driving of the outboard engine is stopped, and the operation ends. This series of controls is such that if a position where the anomaly of the turn angle sensor is detected is in an area which exceeds the threshold, the turn control is made to continue in accordance with the value of the turn angle sensor of the other outboard engine in a similar way to the way taken when it is normal until the position falls within the threshold, and once the position falls within the threshold, the position is controlled so as not to go beyond the threshold. In the tracking control in S406, even on the normal turn angle sensor side, since when a turning endmost portion is reached, the driving to turn the actuator is stopped or the electric power is reduced, also on the anomalous sensor side, even when in the worst case, the actuator is stopped similarly or the electric power is reduced after a certain length of time has elapsed. However, prior to this, the turn angle is divided into, for example, predetermined periods of time so that a tracking control of tracking the normal turn angle sensor continues within a predetermined period of time, and thereafter, the control is stopped or the electric power is reduced until the turn angle falls again within the range b or the turn angle can be controlled only in a direction in which it returns to the central position.

Figure 5:
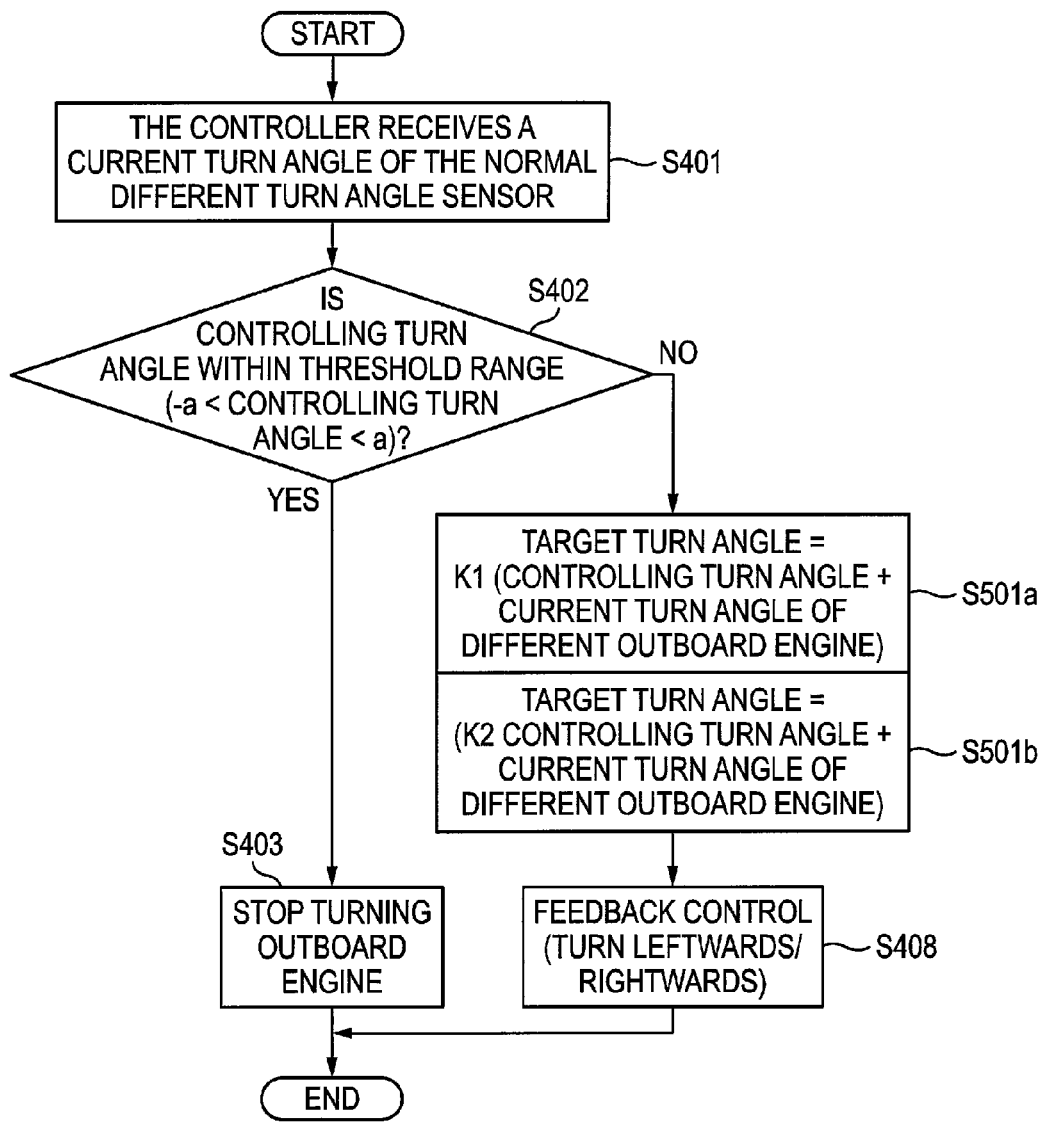
FIG. 5 is a flowchart of a control in Embodiment 1.

Next, a different control method will be described by reference to FIG. 5. Like reference numerals to those in FIG. 4 are understood to denote like operations. When calculating a target turn angle in S501a, by multiplying what results from a sum of the controlling turn angle and the current turn angle of the other outboard engine by a coefficient K1 (K1<1), the target turn angle itself is limited within a narrower range than when the turn angle sensor is normal. Thereafter, in S408, the normal feedback control is made to continue based on a difference between the target turn angle and the turn angle of the other outboard engine. Here, since target turn angles based on the value of the normal turn angle sensor and the value of the anomalous turn angle sensor differ, the target turn angle based on the value of the anomalous turn angle sensor is controlled by use of a difference between the previous or last value and the current value of the normal turn angle sensor. Further, as a further different method for imposing a limitation on a target turn angle, it is possible as shown in S501b to multiply the controlling turn angle by K2 (K2<1) to the controlling turn angle itself. The outboard engine can continue to be driven to turn with the turn angle limited to a smaller area than when the turn angle sensor is normal. Furthermore, an upper limit can be added to the target turn angle itself. The selection of these limit adding methods can be made to be dependent on constructions of the steering wheel which include, for example, a free wheel which constitutes a construction in which there is no limitation imposed on the steering angle of the steering wheel whereby the steering wheel can continue to be turned any number of times in one direction to steer the vessel and an opposite construction in which there is a limitation on the steering angle of the steering wheel as of a steering wheel of a motor vehicle. On the other hand, a difference in turn angle is generated at the one outboard engine and the other outboard engine by the limitation so imposed on the steering angle, and this leads to a possibility that the operator of the vessel is made to feel the sensation of physical disorder by the limitation. Because of this, a similar limitation is imposed on the outboard engine whose turn angle sensor is normal, whereby such a sensation of physical disorder can be eliminated.

When the turn angle sensor is determined to have recovered from the anomalous state, it is easy to restore the normal control on the turn angle sensor which is now normal. For example, a different means is provided for stop updating only the last value of the turn angle sensor but continuing the updating of the current value thereof when an anomaly of the turn angle sensor is detected, so that the determination on whether the turn angle sensor is normal or anomalous continues. By allowing the determination on whether the turn angle sensor is normal or anomalous to continue even when the turn angle sensor is being anomalous the normal control can easily be restored on the turn angle sensor as soon as the turn angle sensor gets back to the normal. In addition, there is a method in which the last value of the turn angle sensor is stored when the turn angle sensor is determined to be anomalous and updating is made to continue as when the turn angle sensor is normal so as to determine whether the turn angle sensor is normal or anomalous.

Thus, as has been described theretofore, when an anomaly of the turn angle sensor is detected, the steering system of the embodiment provide not only an advantage that the turn control can be continued based on the turn angle sensor of the normal actuator of the other outboard engine but also an advantage that the vessel continues to be steered without a failure of the actuator by imposing the limitation on the turn angle.

Embodiment 2

Figure 6:
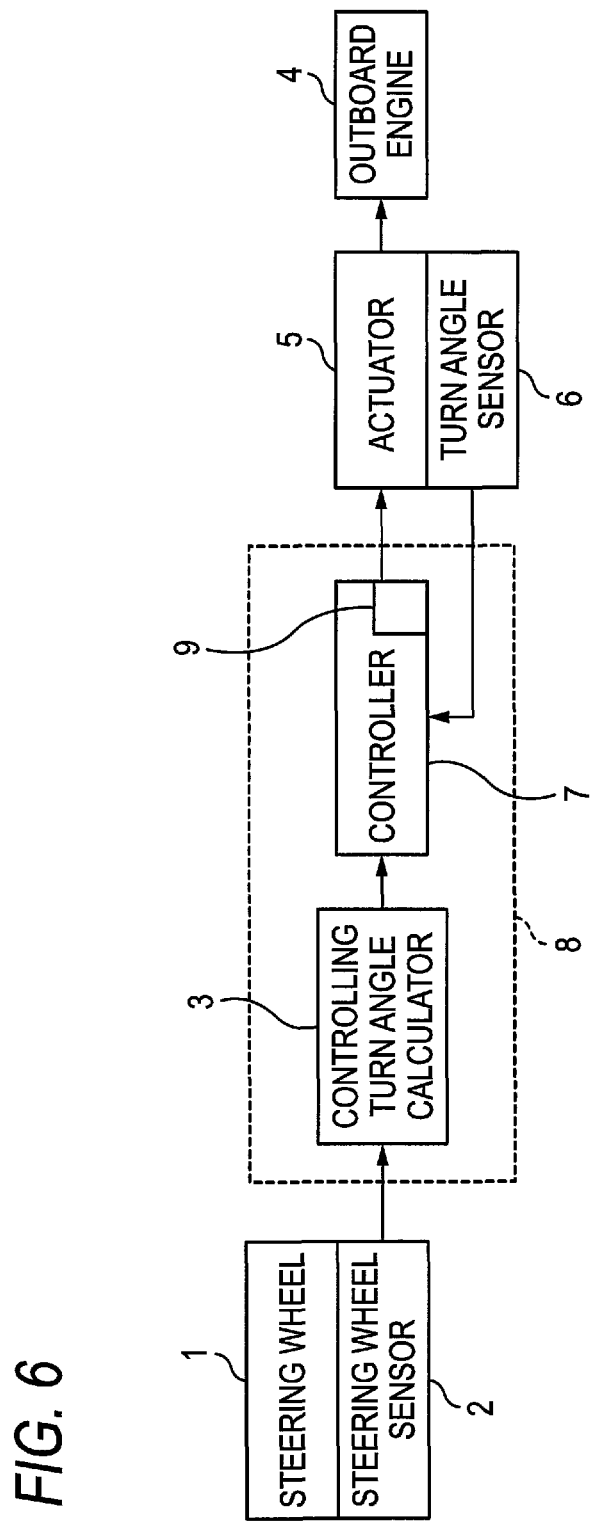
FIG. 6 is a system configuration diagram of a steering system of Embodiment 2.

Next, a method will be described which can deal with a case where only one actuator and one turn angle sensor are installed as in a small vessel and an anomaly of the turn angle sensor is detected, resulting in no normal turn angle sensor existing in the vessel. A system configuration is shown in FIG. 6, and a controller (7) of this vessel has a driving current detection means (9) for detecting a current which drives an actuator. The driving current detection means (9) needs to detect both currents which drive an actuator (5) to turn an outboard engine leftwards and rightwards.

Figure 7:
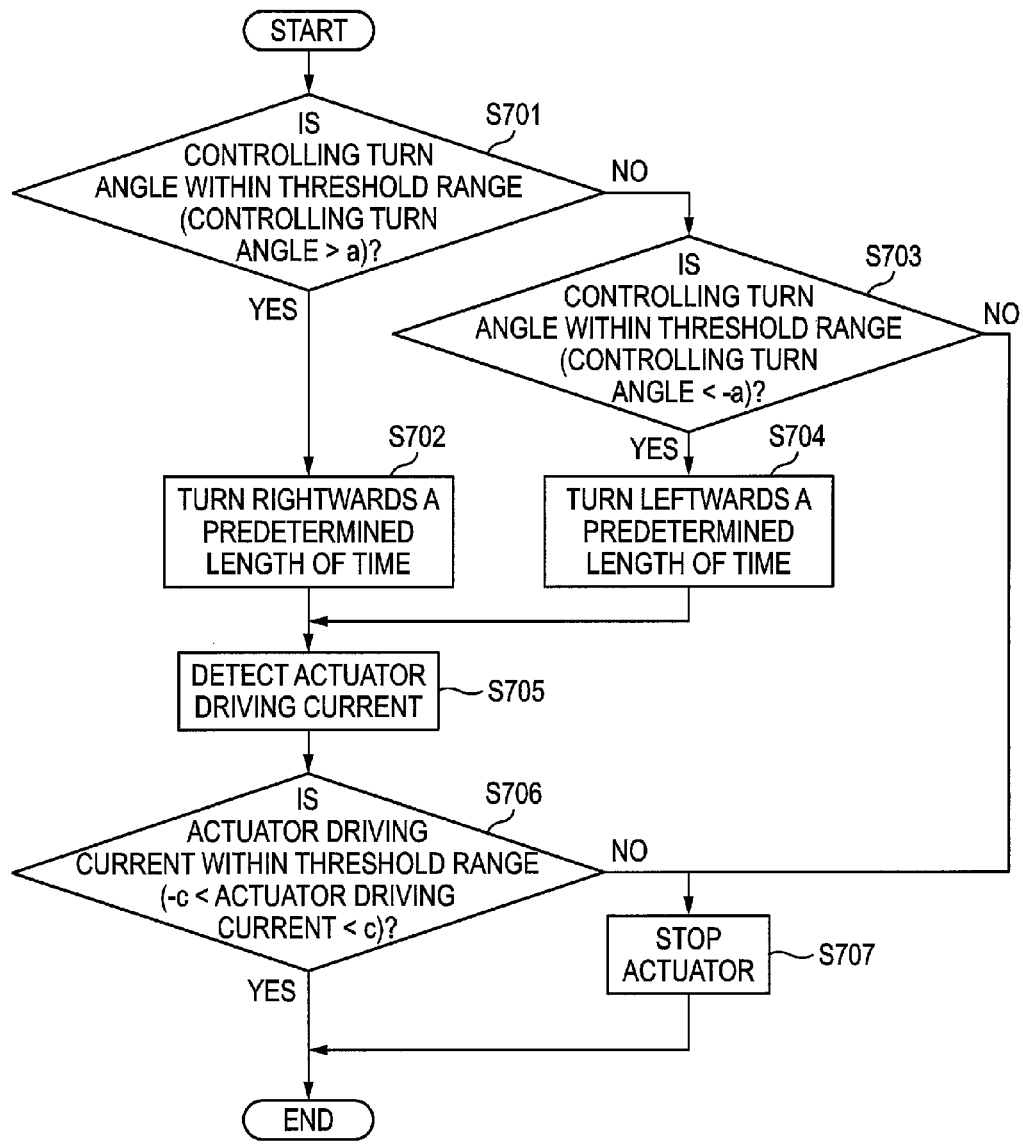
FIG. 7 is a flowchart of a control in Embodiment 2.

A method for making the outboard engine continue to turn by use of the driving current detection means (9) will be described along a flowchart shown in FIG. 7. If a controlling turn angle is determined to be within a range of a threshold value (the controlling turn angle>a) in S701, the actuator (5) is driven to turn the outboard engine rightwards a predetermined length of time in S702. If the controlling turn angle is determined to be within the range of the threshold (the controlling turn angle<−a) in S703, the actuator (5) is driven to turn the outboard engine leftwards a predetermined length of time in S704. This threshold a is an amount of play of the steering wheel described in Embodiment 1, and when the threshold is equal to or larger than a constant angle, fine operations of the steering wheel can be ignored so that the turning of the outboard engine is not affected.

Next, a driving current of the actuator is detected in S705. Whether the driving current is larger or smaller than a threshold |c| is determined in S706. If a current value is smaller than the threshold |c|, the driving of the actuator is made to continue as it is. If the current value is larger than the threshold |c|, judging that the outboard engine is on a boundary of its operation range and that when the outboard engine is turned any further, the steering system fails, the driving of the actuator is stopped in S707. The driving of the actuator does not have to be stopped abruptly but can be stopped gradually by so reducing the driving current.

The predetermined length of time in S702 or S704 is a time which is predetermined based on experiments. The value of the current that flows can be varied. Triggering a variation in time and current is dependent on the magnitude of the controlling turn angle or speed, and since the outboard engine is turned more quickly with a larger current value, the predetermined length of time is shortened. In contrast, with a small current value, the predetermined length of time can be modified to be longer. The thresholds a, c do not have to take a constant value but can be made to vary depending on the speed of the vessel so that the thresholds increase as the vessel speed increases.

Embodiment 3

Figure 8:
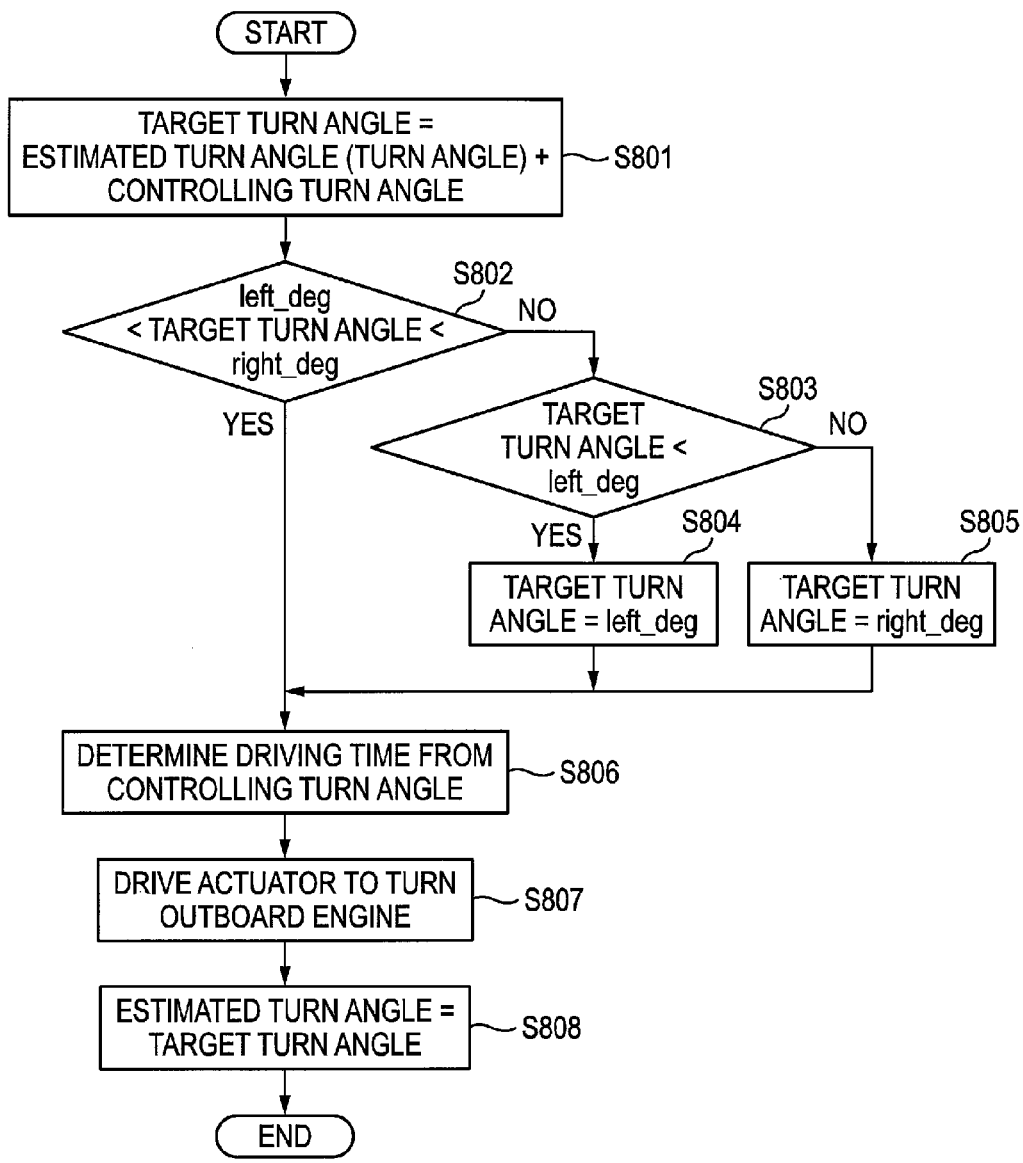
FIG. 8 is a flowchart of a control in Embodiment 3.

Next, as a further different method, a method will be described which utilizes an estimated turn angle. Understanding that a turn angle estimation means is disposed in a controller (7), a specific method will be described along a flowchart shown in FIG. 8.

In S801, a target turn angle is calculated. According to the method, an estimated turn angle is added to a controlling turn angle for calculation of a target turn angle. In a first control after detecting an anomaly of a turn angle sensor, the normal last turn angle is used for this purpose which is described in S302 in the flowchart shown in FIG. 3 of Embodiment 1. Thereafter, an estimated turn angle is used which will be described later.

Next, a turn limit angle of an outboard engine is limited in S802. A leftward limit angle is referred to as left_deg, and a rightward limit angle is referred to as right_deg. Namely, in S802, whether or not a target turn angle falls within the turn limit angle of the outboard engine is determined. If the target turn angle exceeds the turn limit angle of the outboard engine, the turn limit angle of the outboard engine is made to become the target turn angle. Which limit angle of a port-side limit angle and a starboard-side limit angle the target turn angle exceeds is determined in S803. If the target turn angle exceeds the port-side limit angle, the target turn angle is set to left_deg which is the port-side limit angle in S804. If the target turn angle exceeds the starboard-side limit angle, the target turn angle is set to right_deg which is the starboard-side limit angle in S805.

A driving time of an actuator is determined from the controlling turn angle in S806. A driving current can also be controlled. Being different from the time and current varying method described in Embodiment 2, this actuator driving current value can be determined from vessel speed, trim angle, shift position or the like so as to enable a highly accurate control in which the estimated angle and an actual turn angle of the outboard engine are close to each other. For example, a coefficient is set which varies in accordance with, for example, vessel speed, trim angle, target turn angle, or current turn angle, and a correction is implemented by multiplying the current value by the coefficient so set. For example, a vessel speed coefficient is set so that the current value increases as the vessel speed increases. A trim angle coefficient is set so that the current value increases as the trim angle decreases. Relationships between the current value and these coefficients are stored in a map so that time and current can be varied depending on the operating conditions of the vessel at a point in time of control. This is because in the case of the outboard engine, a load that is borne by the outboard engine varies depending on vessel speed and trim angle, which varies the current value necessary to turn the outboard engine. In addition, in the case of a plurality of outboard engines being installed, there is a case where rotating directions of propellers are reversed. When the outboard engines are turned by the rotating directions of the propellers, loads that are borne by the outboard engines differ at the left and right outboard engines. Because of this, the current necessary to turn the outboard engines can be varied even based on the installation positions of the outboard engines. Similarly, since the rotations of the propellers become opposite even when the vessel is advanced or reversed, the current value can also be varied based on the shift position. The outboard engines are driven to be turned at the determined values in S807.

If the driving time is determined to have elapsed in S808, the estimated turn angle is updated as a target turn angle. By doing so, except for the time when the turn angle sensor is initially detected to be anomalous, the estimated turn angle can be used in S801. Since this estimated turn angle is an estimated value to the last, an error from the actual turn angle is produced, and although there is a chance that this error decreases, there may be a risk that the error increases. For example, when a situation continues in which although the vessel speed is equal to or faster than a predetermined vessel speed, the outboard engines are not turned either leftwards or rightwards, by resetting the estimated turn angle to the center or 0, the estimated turn angle equals the actual turn angle so as to suppress the error, as a result of which the accuracy of the turn control can be increased.

Being different from the feedback control of the target turn angle in Embodiment 1, the turn angle estimation method adopts a so-called open control. By adopting this control, the method can be used in the operations 1, 2 which are intended to deal with the anomaly in S306, S307 in the flowchart shown in FIG. 3. In addition, in the non-synchronizing operation in S306, a turn control in which the turn angle for non-synchronizing operation is limited can also be implemented by limiting the map for calculating an estimated turn angle so that the turn angle is decreased further for the purpose of preventing the interference between the outboard engines. Further, in the non-synchronizing operation, the limit value left_deg and right_deg of the target turn angle in S804, S805 can take different values. For example, it is considered that the limit value in an opposite direction to the steering direction of the vessel by the operator of the vessel takes a small value. In addition to the case where the limit value simply takes the small value, in the case of the turning direction of one outboard engine being opposite to the turning direction of the other outboard engine, in order to prevent the interference between the outboard engines, the limit value in a direction in which the outboard engines approach each other can be made small, while the limit value in a direction in which the outboard engines move away from each other can be made large. In addition, in the case of three or more outboard engines being installed, in order to prevent the interference of a central outboard engine with those disposed on both sides thereof, the limit value can be made not too small. In this method, the steering response of the vessel can be increased. Further, the limit values left_deg and right_deg can also be made to take small values compared with the clipping value in S208 in the flowchart shown in FIG. 2.

Furthermore, if the non-synchronizing operation is adopted when an anomaly of the turn angle sensor is detected, the control of the actuators can be switched to the synchronizing control. As long as the outboard engines are in a safety condition such as in neutral and at idling even when the outboard engines are turned without any intention of the operator of the vessel, the outboard engines can automatically be turned to substantially accurate positions by making use of the normal value before the anomaly of the turn angle sensor was detected as soon as the anomaly is detected. Here, the outboard engine to be turned may be the outboard engine whose turn angle sensor is anomalous or the outboard engine whose turn angle sensor is normal. In addition, in the event that the outboard engines are in such a condition that turning the outboard engines triggers a danger, switching to the synchronizing operation is waited for until the safety condition is restored. In addition, the synchronizing operation can also be restored when the outboard engines come to take the same positions while the vessel is steered. Once the synchronizing operation is restored, as in S305 in the flowchart shown in FIG. 3, the outboard engine whose turn angle sensor is detected to be anomalous may be operated to track the other outboard engine whose turn angle sensor is normal.

Embodiment 4

Figure 9A:
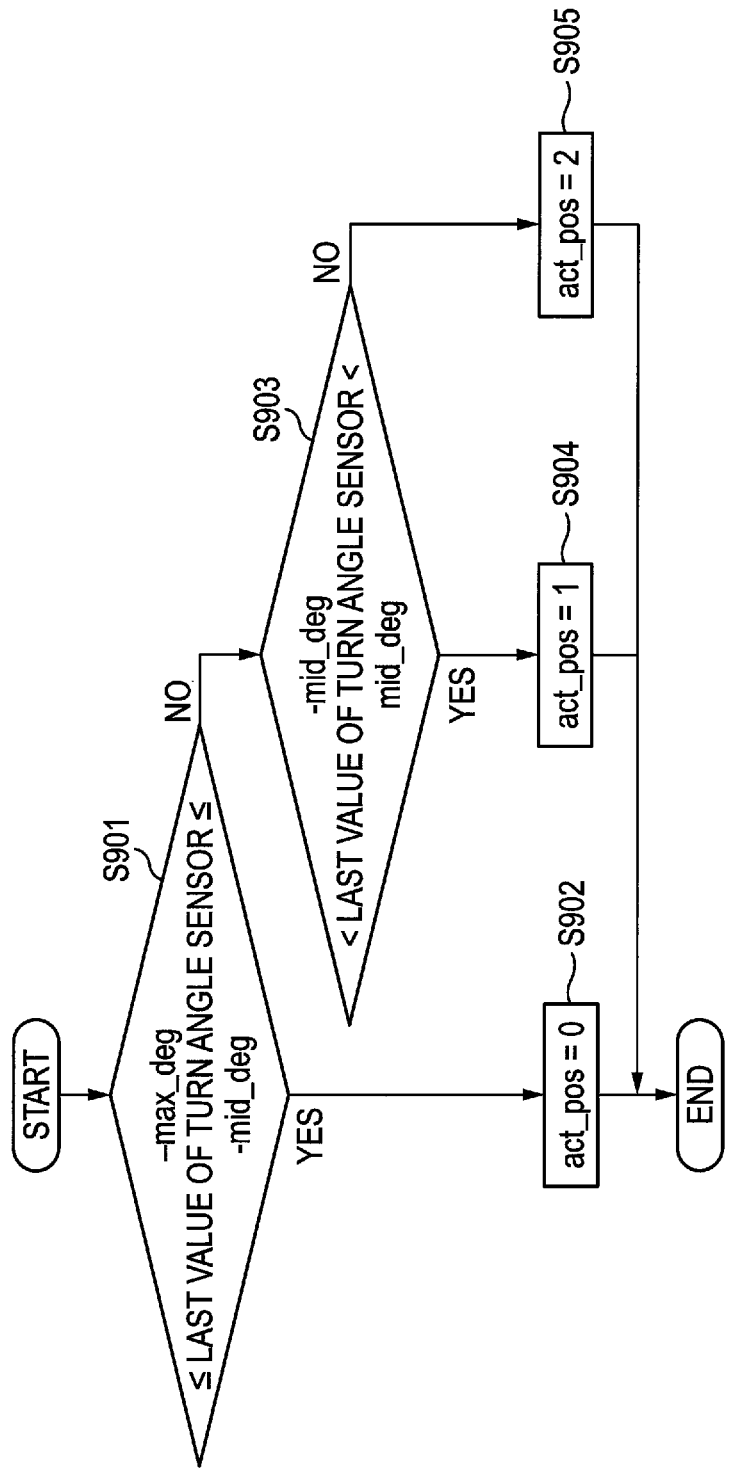
FIGS. 9A and 9B are flowcharts of a control in Embodiment 4.

As a further different method, a method will be described by use of FIGS. 9A and 9B in which when a controller detects an anomaly of a turn angle sensor, a turning position of an outboard engine whose turn angle sensor is detected to be anomalous is controlled in a plurality of stages while depending on a predetermined actuator driving time. In an example of a control area of an outboard engine when the turning position is controlled most simply in three stages, for example, max_deg=100%, mid deg=20%. A flow is shown in FIG. 9A which determines the position of the outboard engine from the last value of the turn angle sensor. Whether the last value of the turn angle sensor is within an area expressed by −100≦the last value of the turn angle sensor≦−20 is determined, and if the last value is determined to be within the area, act_pos=0. If the last value is determined not to be in the area in S901, whether or not the last value is within an area expressed by −20<the last value of the turn angle sensor<20 is determined in S903. If the last value is determined to be within the area, act_pos=1. If the last value is determined not to fall within both the areas in S901, S903, since the last value is understood to be within an area expressed by 20≦the last value of the turn angle sensor≦100, act_pos=2.

Figure 9B:
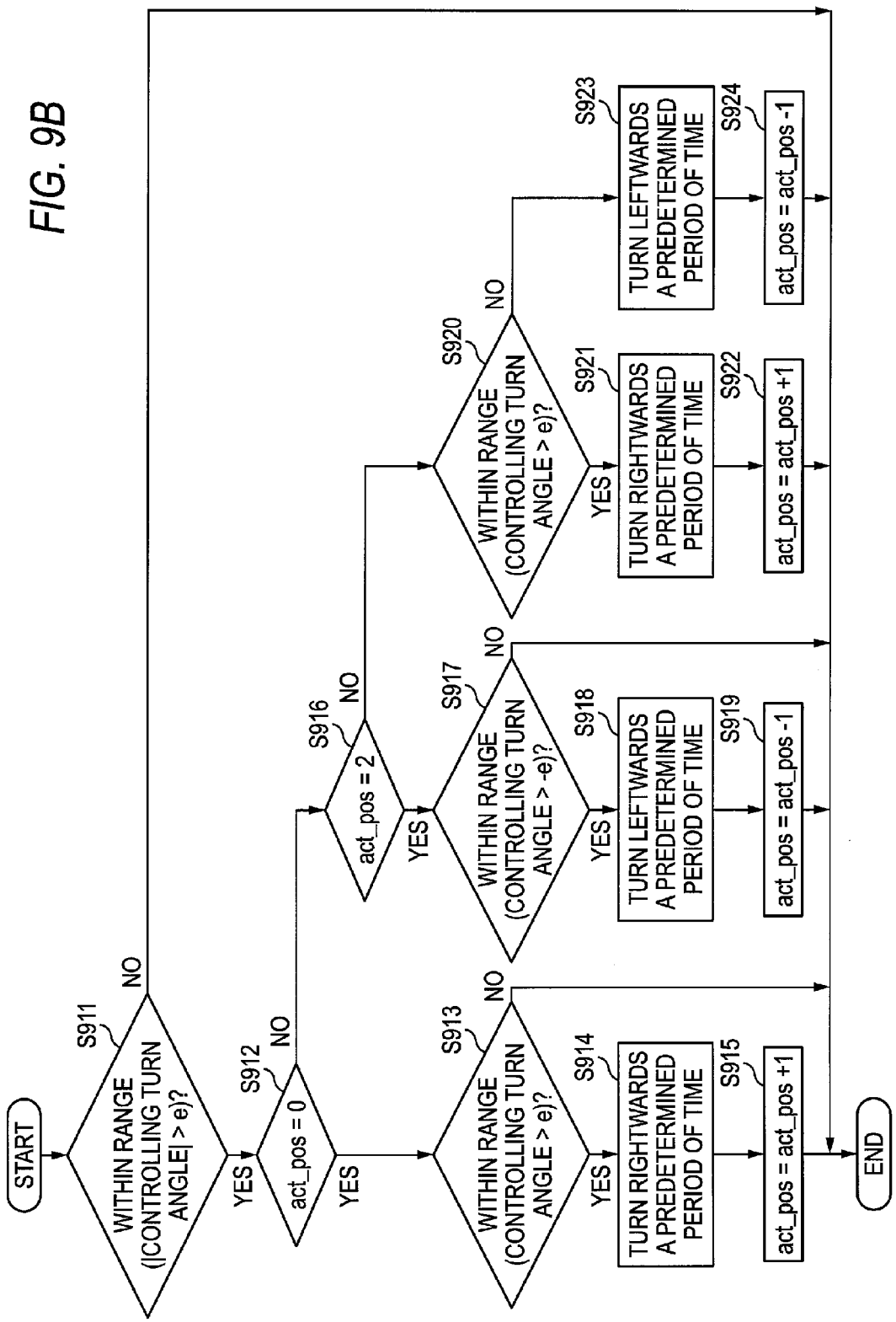

An operation example is shown in FIG. 9B which results when the three-stage control is implemented by the operator of the vessel by operating the steering wheel after the position of the outboard engine has been determined.

Firstly, in S911, whether or not the operator of the vessel has operated the steering wheel through a constant angle (a threshold e) or more is determined. In this operation, since the outboard engine is controlled in a plurality of stages, the threshold is provided so that the outboard engine is not moved even when the steering wheel is operated finely. The threshold e can be set to a variable value as with the threshold c in Embodiment 2. If the steering wheel is determined to have been operated through the predetermined angle or more in S911, the flow of the method proceeds to S912, where whether or not act_pos=0 is determined. If act_pos=0, since it means that the outboard engine is directed to an extreme of the port side, the outboard engine is allowed to turn only towards the starboard side from that position, and the outboard engine is never turned towards the port side from that position. If it is determined that the outboard engine is to be turned towards the starboard side in S913, the outboard engine is turned rightwards a predetermined time. Since the position of the outboard engine is turned to the vicinity of a center from the port side by the turn made in S914, act_pos is updated from 0 to 1 in S915. In contrast, if act_pos=2 in S916, since it means that the outboard engine is directed to an extreme of the starboard side, the outboard engine is allowed to turn only towards the port side from that position, and the outboard engine is never turned towards the starboard side from that position. If the outboard engine is requested to be turned towards the port side in S917, the outboard engine is turned leftwards a predetermined time. Since the position of the outboard engine is turned to the vicinity of the center from the starboard side by the turn made in S918, act_pos is updated from 2 to 1 in S919. If neither the case in S912 nor the case in S916 is accepted as positive, it means that act_pos=1, and therefore, the flow of the method proceeds to S920. Since the outboard engine is understood to stay in the central position, the outboard engine can be turned both leftwards and rightwards. Which direction the outboard engine is to be moved depends on the controlling turn angle (S921, S923). After the outboard engine has been turned the predetermined time, the position of the outboard engine act_pos is updated (S922, S924).

As a turning time, an actuator driving time is set in advance depending on the number of control stages, driving current or the like. In the event that the actuator driving time is set to match a control in which the number of control stages is large or extensions of turning areas of the outboard engines are different, the turning time can be made to vary according to positions. In addition, in the event that the number of control stages is increased, two or more thresholds are given to the controlling turn angle, so that the outboard engine may be turned through several areas at one time depending on the magnitudes of the thresholds. With a view to increasing accuracy to increase safety, in a system in which an engine controlling controller is provided for controlling the ignition of the engine, injection of fuel or induction air amount, and the engine controlling controller and a controller for an actuator are made to communicate with each other through CAN, an operation of limiting vessel speed may be added in which when a turn angle sensor fails, the vessel speed is limited by reducing the fuel injection amount or induction air amount.

Embodiment 5

Figure 10:
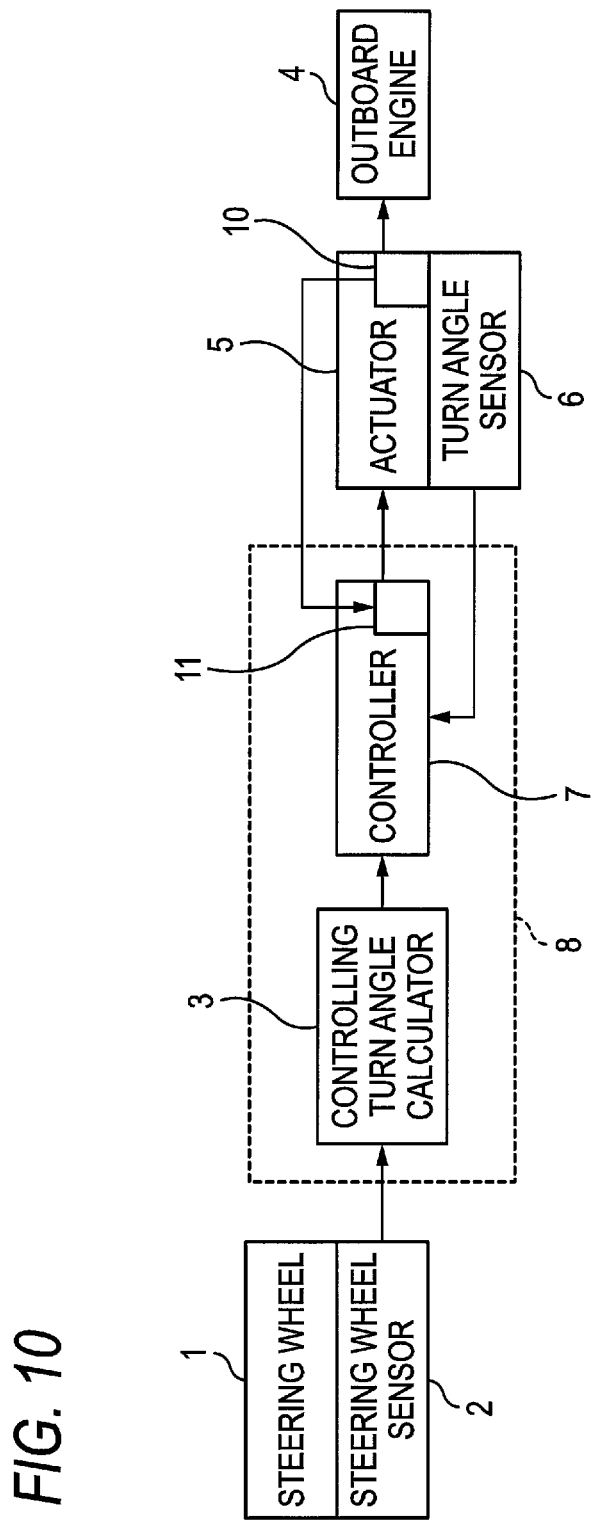
FIG. 10 is a system configuration diagram of a steering system of Embodiment 5.

In addition, as a further method, a system configuration is shown in FIG. 10 which has a motor angle sensor for detecting not a turn angle of an outboard engine itself but a turn angle of a motor. In the figure, reference numeral 10 denotes a motor angle sensor for an actuator motor, and a controller (7) has a motor angle calculation means (11). The motor angle calculation means (11) calculates a turn angle of the motor when the motor is turned rightwards or leftwards by a signal from the motor angle sensor (10), and the turn angle of the motor is such as to correspond to the turn angle of the outboard engine.

Figure 11:
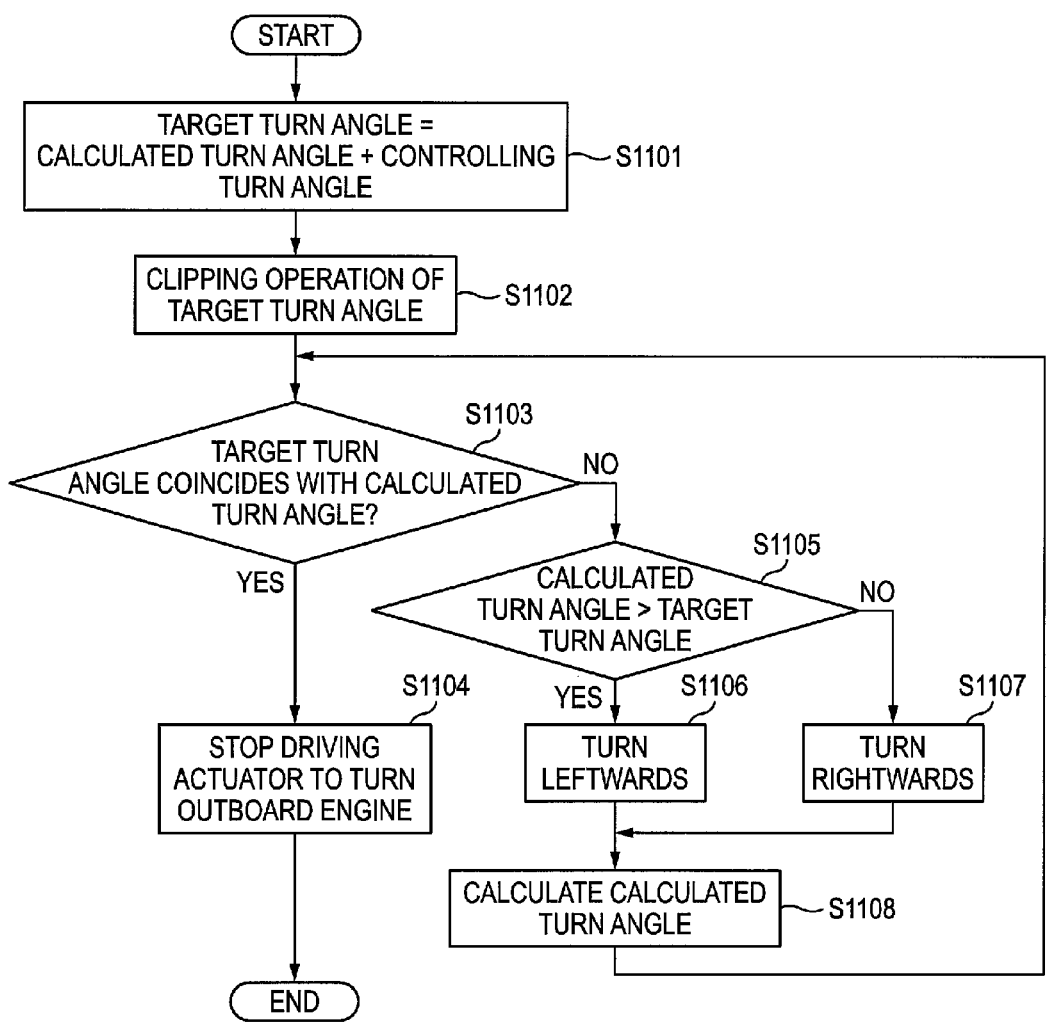
FIG. 11 is a flowchart of a control in Embodiment 5.

A method for making an outboard engine continue to turn by use of the motor angle calculation means (11) will be described along a flowchart shown in FIG. 11. Here, a turn angle that is to be calculated by the motor angle calculation means is referred to as a calculated turn angle. As with Embodiment 3, the normal last turn angle in S302 in the flowchart shown in FIG. 3 of Embodiment 1 is used in a control in which an anomaly of a turn angle sensor is initially detected. Thereafter, a calculated turn angle, which will be described below, is used.

In S1101, a controlling turn angle is added to the calculated turn angle for calculation of a target turn angle. The controller (7) performs a clipping operation so that the target turn angle falls within a range determined in advance for the target turn angle in S1102. In S1103, whether or not the target turn angle coincides with the calculated turn angle is investigated. If the target turn angle and the calculated turn angle are determined not to coincide with each other (NO), the calculated turn angle is compared with the target turn angle in S1105. If the calculated angle is determined to be larger than the target turn angle (YES), the outboard engine is turned leftwards in S1106, whereas if the calculated turn angle is smaller than the target turn angle (NO), the outboard engine is turned rightwards in S1107. When the outboard engine is turned so in S1106, S1107, the controller (7) calculates a calculated turn angle by a signal from the motor angle sensor (10) in S1108 and operates a feedback control. Then, if the target turn angle comes to coincide with the calculated turn angle (YES), the driving of the actuator is stopped in S1104.

As has been described heretofore, the same advantage as that provided by the method which utilizes the turn angle sensor for the outboard engine can be provided even by the method which utilizes the turn angle of the motor based on the driving of the actuator in place of the turn angle sensor for detecting the turn angle of the outboard engine. Needless to say, the invention is not limited to the respective embodiments that have been described heretofore but includes every possible combination of these embodiments. Although the control angle calculator (3) for calculating a controlling turn angle from a steering wheel sensor signal which carries the intention of the operator of the vessel and the controller (7) for driving the actuator in accordance with a difference between the controlling turn angle and the turn angle sensor are described separately, these means can be configured as an integral controller. In addition, the operation of setting a play for the steering wheel by provided a threshold for the controlling turn angle is effective for any of the embodiments described whether the turn angle sensor is normal or anomalous.

In the steering system of the embodiments, when an anomaly of the turn angle sensor is detected, the non-synchronizing control is stopped so that the control is shifted to the synchronizing control. In the event that the turn angle sensor is determined to be restored from the anomalous state, it is easy to restore the normal control on the turn angle sensor.

According to the steering system of the embodiments, even when an anomaly of the turn angle sensor is detected, the outboard engine can be driven to turn in accordance with the intention of the operator of the vessel, thereby making it possible to make the vessel continue to be operated according to the intention of the operator. In addition, the outboard engine is allowed to continue to be driven to turn irrespective of the numbers of outboard engines and turn angle sensors.

In the steering system of the embodiments, the turn angle sensor may constitute the motor angle sensor as described in Embodiment 5, and in the event that the turn angle sensor is any sensor which can detect the position of the actuator, the turn angle sensor can, needless to say, realize all the embodiments.

The invention claimed is:

1. A steering system for a vessel in which at least one outboard engine is installed, said steering system comprising:
   a steering wheel configured to receive an instruction of a steering direction;
   a steering wheel sensor configured to detect an operation angle of the steering wheel;
   an actuator configured to turn the outboard engine;
   a plurality of turn angle sensors including a first turn angle sensor configured to detect a turn angle of the outboard engine turned by the actuator; and
   a control unit configured to calculate a controlling turn angle for driving the actuator to turn the outboard engine based on the operation angle, and to drive the actuator to turn the outboard engine in accordance with a difference between the controlling turn angle and the turn angle,
   wherein if an anomaly of the first turn angle sensor is detected, the control unit continues to drive the actuator to turn the outboard engine based on information from a second turn angle sensor of the plurality of turn angle sensors which is in a normal state, and drives the actuator so as to limit the turn angle of the outboard engine as compared with a case in which the first turn angle sensor is in a normal state.

2. The steering system according to claim 1,
wherein the control unit continues to control the actuator so as to limit a drive of the actuator, such that an area within which the actuator can turn the outboard engine is smaller than a maximum area in which the outboard engine can turn.

3. The steering system according to claim 2,
wherein if the outboard engine is turned to an area which exceeds a threshold turn angle when an anomaly of the first turn angle sensor is detected, the control unit continues to drive the actuator to turn the outboard engine while depending on the second turn angle sensor in the normal state, and if the outboard engine falls within the threshold turn angle, the control unit drives the actuator while limiting a driving area of the actuator to an area which falls within the threshold turn angle.

4. The steering system according to claim 1,
wherein if the outboard engine is turned to an area which exceeds a threshold turn angle when an anomaly of the first turn angle sensor is detected, the control unit continues to drive the actuator to turn the outboard engine while depending on the second turn angle sensor in the normal state, and if the outboard engine falls within the threshold turn angle, the control unit drives the actuator while limiting a driving area of the actuator to an area which falls within the threshold turn angle.

5. A steering system for a vessel in which at least one outboard engine is installed, said steering system comprising:
a steering wheel configured to receive an instruction of a steering direction;
a steering wheel sensor configured to detect an operation angle of the steering wheel;
an actuator configured to turn the outboard engine;
a turn angle sensor configured to detect a turn angle of the outboard engine turned by the actuator; and
a control unit configured to calculate a controlling turn angle for driving the actuator to turn the outboard engine based on the operation angle, and to drive the actuator to turn the outboard engine in accordance with a difference between the controlling turn angle and the turn angle,
wherein if an anomaly of the turn angle sensor is detected, the control unit continues to drive the actuator to turn the outboard engine based on a predetermined current over a predetermined length of time which is determined in advance in accordance with the controlling turn angle.

6. The steering system according to claim 5,
wherein the control unit comprises a driving current detection unit configured to detect a driving current for driving the actuator, and
wherein if the driving current falls within a range smaller than a predetermined value, the control unit continues to drive the actuator to turn the outboard engine, and if the driving current is larger than the predetermined value, the control unit stops driving the actuator which turns the outboard engine.

7. The steering system according to claim 6,
wherein the control unit comprises a turn angle estimation unit which is configured to:
calculate a target turn angle by adding the controlling turn angle to a current turn angle;
limit the target turn angle and determine a driving current for driving the actuator or a driving time from the controlling turn angle for controlling the turning of the outboard engine if an anomaly is detected in the turn angle sensor; and
adding the controlling turn angle to an estimated turn angle, based on a judgment that the target turn angle is the same as the estimated turn angle, to thereby obtain a next target turn angle for a next control.

8. The steering system according to claim 5,
wherein the control unit comprises a turn angle estimation unit which is configured to:
calculate a target turn angle by adding the controlling turn angle to a current turn angle;
limit the target turn angle and determine a driving current for driving the actuator or a driving time from the controlling turn angle for controlling the turning of the outboard engine if an anomaly is detected in the turn angle sensor; and
adding the controlling turn angle to an estimated turn angle, based on a judgment that the target turn angle is the same as the estimated turn angle, to thereby obtain a next target turn angle for a next control.

9. The steering system according to claim 5,
wherein if an anomaly of the turn angle sensor is detected, the control unit divides the turn angle into a plurality of stages so as to control a drive of the actuator in accordance with driving times and driving currents which are determined in advance for the respective divided stages.

* * * * *